May 19, 1964 — T. A. RIBICH — 3,133,339
TOOL HAVING IMPROVED CUTTING QUALITIES
Filed July 10, 1961
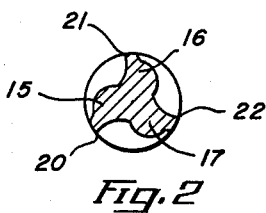
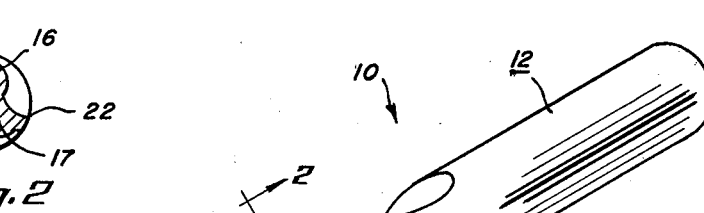
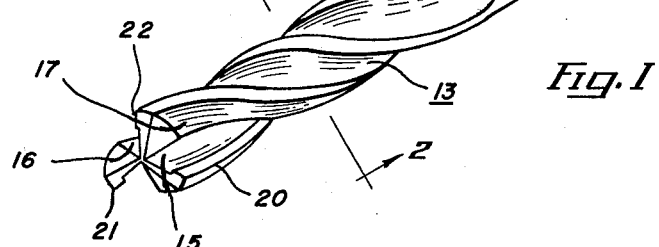
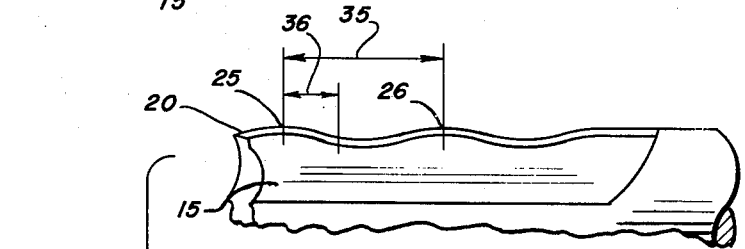
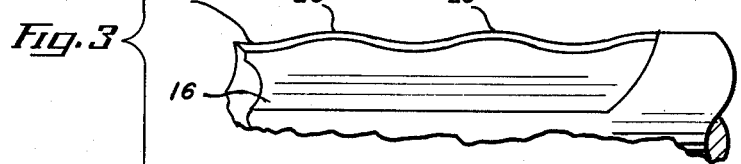
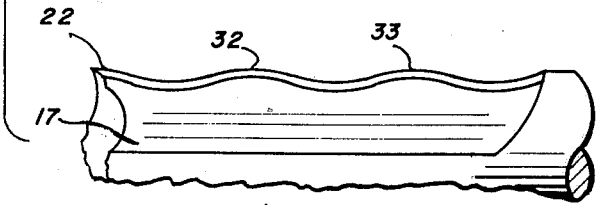
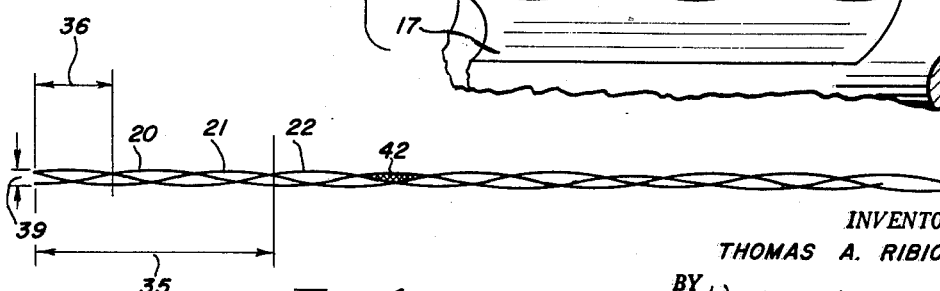
INVENTOR.
THOMAS A. RIBICH

United States Patent Office 3,133,339
Patented May 19, 1964

3,133,339
TOOL HAVING IMPROVED CUTTING QUALITIES
Thomas A. Ribich, Cleveland, Ohio, assignor to The Weldon Tool Company, a corporation of Ohio
Filed July 10, 1961, Ser. No. 122,874
4 Claims. (Cl. 29—103)

The present invention relates in general to rotating cutting tools and more particularly to end mills and the like which have an improved cutting action.

In many cutting tools to which the present invention is applicable, for example end mills, the several cutting edges thereof extend in a helical direction and corresponding portions of the cutting edges bear the same relationship to a given point, for example the axis of the tool. In such tools the entire length of the cutting edge is exposed to the work at the same time and as a result the load is on the entire length of the cutting edge which results in many cases to poor cutting action and/or a rapid wearing of the cutting edge. The present invention relates to a teaching wherein cutting edges are provided which are on a generally smoothly continuous curve which has a relatively small depth or amplitude as compared to the pitch or cycle of the curve. The curves defined by the edges are also offset or out of phase with each other resulting in a much improved cutting action and a longer life. In the use of the present invention it is also possible to cut a chip which is either continuous or discontinuous with the resultant advantages, and the chips are generally "moon shaped" or thick in the center and thin at either end and connected together by a thin web of metal in the case of the continuous chips. The present invention should be properly understood to be different from the so-called chip breaker type of designs which are solely for the purpose of producing a discontinuous type of chip and are usually deep or radical types of rectangular or curved interruptions in the cutting edge. These designs do not compare at all to the present invention and if compared at all would have to be said to have a relatively large depth as compared to pitch. Another definite distinction between the types under discussion is that in the present design the chip load and the depth or amplitude are quite close together and as a result can be varied quite easily relative to each other to produce a continuous chip when the chip load is greater than the depth and a discontinuous chip when the chip load is less than the depth. In the prior art devices it is virtually impossible to produce a chip which is continuous. Chip load as discussed herein is defined by the formula:

$$\text{Chip load} = \frac{\text{Feed rate/rev.}}{\text{No. of cutting edges}}$$

The advantages to being able to produce a continuous or discontinuous chip will be apparent to those skilled in the art and serves to distinguish over the prior art designs discussed above. An example of chip load referred to above can be illustrated as follows. If the longitudinal feed rate of an end mill such as that illustrated in the drawings herein were .009 and the revolution was 1.0 then the chip load would be .003. If the amplitude or depth of the cutting edge curve were greater than .003 then a discontinuous chip would be produced and the opposite when the depth is less. When the depth and chip load are approximately equal, a discontinuous chip is usually the result because the connecting web between chips, if one results, usually breaks because it is very weak.

It is therefore an object of the present invention to provide an improved cutting edge for rotating type tools as described above.

Another object of the present invention is to provide a tool having a plurality of cutting edges each of which is on a generally continuous type curve with each curve being out of phase or off-set with respect to the others.

Another object of the present invention is to provide a tool having a cutting edge which is on a generally continuous type curve which has a small depth or amplitude as compared to the pitch or cycle of the curve.

Another object of the present invention is to provide a tool having an improved cutting edge which gives a longer life thereto.

Other objects and a fuller understanding of this invention may be had by referring to the following description and claims, taken in conjunction with the accompanying drawing, in which:

FIGURE 1 is an isometric view illustrating the present invention as applied to an end mill however, the amplitude or depth of the cutting edges as well as the out of phase relationship is too small to illustrate in this view.

FIGURE 2 is a cross sectional view taken generally along the line 2—2 of FIGURE 1 however, the amplitude or depth of the cutting edges as well as the out of phase relationship is too small to illustrate in this view.

FIGURE 3 is a side elevational view illustrating the three cutting edges on the three flutes of the tool shown in FIGURE 1 and illustrates the edges and the flutes as being untwisted or in other words extending in a straight line direction rather than a helical direction; and FIGURE 4 is a representation of the path followed by the cutting edges which are located respectively on the three flutes of the tool.

FIGURES 1 and 2 illustrate respectively an end mill 10 to which the present invention has been applied in order to produce a new and improved tool. The end mill 10 includes in combination a shank end portion 12 and a cutting end portion 13. The shank end portion 12 as is usually the case, is adapted to be held for example in a chuck and rotated by an appropriate power device.

The cutting end portion in this embodiment is comprised of a plurality of flutes, specifically three in number and indicated by the reference numerals 15, 16 and 17 respectively. Cutting edges 20, 21 and 22 respectively are provided on the respective flutes 15, 16 and 17 and these cutting edges as well as the flutes extend in a generally helical direction around the longitudinal axis of the tool 10.

In the normal design of a straight sided end mill the cutting edges extend around the axis of the tool in a generally helical direction with the cutting edges being on a substantially constant radius with respect to the axis. In the case of tapered end mills the cutting edge of each of the flutes does have a constantly increasing radius with respect to the axis of the tool as the edge extends from the point of the tool to the shank end portion. However, in tools such as these, corresponding portions of each of the cutting edges are on the same radius which increases in a constant manner from the point of the tool toward the shank end.

The present invention is best illustrated in FIGURES 3 and 4 of the drawings. FIGURE 3 illustrates the three flutes of the tool with the corresponding cutting edges thereon and as illustrated the cutting edges are enlarged and exaggerated for more clarity in explaining the invention. The flutes of the tool shown in FIGURE 3 have been shown in an untwisted condition or they might be referred to as being in a developed condition. The flutes 15, 16 and 17 have been drawn immediately above each other so that the out-of-phase or offset condition of the curves which the cutting edges describe can be illustrated. Referring to flute 15 and the cutting edge 20 thereon, it will be noted that the curve described by this cutting edge has high points or peaks 25 and 26 respectively and valleys therebetween. The distance between peaks 25 and 26 can be defined as the pitch or cycle of this curve. Referring to cutting edge 21 on flute 16 it will be seen that this curve is also provided with high points or peaks indicated by reference numerals 28 and 29, and cutting edge 22 on flute 17 also has high points 32 and 33. It will be noted that the peak 28 of cutting edge 21 is located substantially one-third the distance from peak 25 to peak 26 on the cutting edge 20. It will also be noted that the peak 32 on cutting edge 22 is located substantially two-thirds the distance from peak 25 to peak 26. In other words, the curves of the three cutting edges are offset substantially one-third the distance or 120 degrees of the entire cycle from each other. In other words, in operation as the tool is rotated through its cutting cycle, the peak or high point 25 makes a cut with peaks 28 and 32 making cuts which are spaced progressively along the axis of the tool in a direction toward the shank end. This serves to lower the cutting force on each flute of the tool.

FIGURE 4 is a representation of the curves which are defined by the cutting edges 20, 21 and 22 with the curves being superimposed on each other. In FIGURES 3 and 4 the distance indicated by the reference numeral 35 represents the pitch or complete cycle of the curve represented by the cutting edge 20. The pitch is the same for the cutting edges 21 and 22. The reference numeral 36 represents the offset between each of the curves or it might be said to represent the number of degrees that the curves are out-of-phase with each other. The depth or amplitude of the curves is indicated by numeral 39.

It will be seen that the curves which the cutting edges define are what may be generally referred to as smooth continuous curves and the depth or amplitude 39 of the curves is comparatively small as compared to the pitch or cycle of each curve. These curves have also been illustrated as being something approaching a sign wave in nature, however, in actual practice the peaks and valleys of the curve may be somewhat flattened. The following chart is an illustration of what the proper relationship between working diameter of the tool, chip load, pitch and depth or amplitude should be:

| Diameter, inches | Chip Load, inches | Pitch, inches | Depth or Amplitude, inches |
| --- | --- | --- | --- |
| 1/16–1/4 | .0001–.002 | 1/8–3/8 | .0001–.002 |
| 1/4–3/4 | .001–.004 | 1/4–3/4 | .001–.004 |
| 3/4–1 1/4 | .002–.008 | 3/8–1.0 | .002–.008 |
| 1 1/4–3.0 | .004–.016 | 1/2–1 1/2 | .004–.016 |

These are the desired proper relationships between the variables which have been illustrated. Chip load as discussed hereinabove equals the feed rate of the tool divided by the rotational speed and which in turn is divided by the number of cutting edges on the tool. In other words, if for the sake of a hypothetical example we had a single fluted tool which was being rotated at one revolution per second and was being fed longitudinally at the rate of five-thousandths of an inch per second then the chip load would be equal to .005. If the amplitude or depth of the curve made by the cutting edge of the tool were also .005 then it will be appreciated that the chip which is cut will be severed from the work piece. The cross hatched area 42 shown in FIGURE 4 represents substantially the size of a chip which is removed from the work piece when the chip load is substantially equal to the amplitude or depth of the curve. When the chip load becomes comparatively greater than the depth of the curve a continuous chip is produced which is of the same general configuration as 42 shown in FIGURE 4, however, the plurality of chips 42 are connected at their respective ends by thin webs of metal. When the chip load is less than the depth of the curve described by the cutting edge, a discontinuous chip is produced. When the chip load and depth are quite close to each other even though a thin web of metal may result, this web is usually so weak that it is broken substantially at the same time that the chip is cut. For the sake of a specific example of a tool constructed under the present teachings, if we assume that the pitch 35 is 3/8 of an inch, then the offset 36 will be 1/8 of an inch or in accordance with the formula:

$$\text{Offset} = \frac{\text{Pitch}}{\text{No. of Flutes}}$$

Referring to the chart hereinabove, this would correspond to a tool having a 1/4 to 3/4 working diameter and the depth of amplitude of the curve described by the cutting edge would lie in the range of from .001 to .004″, and for the sake of example, the specific depth might be .003. The overall range for the disclosed invention is pitch from 1/8″ to 1 1/2″, depths from .000″ to .016″ and working diameters from 1/16″ to 3.0″. The chip load is such that it is quite close to the depths.

It will thus be seen that by designing the cutting edges of the rotating type tool as described and within the preferred overall range as described that an improved tool results which has a markedly superior cutting action with a resultant longer life. This results because of the placing of the cutting edges out-of-phase or offset with respect to each other and by designing a curve which has a small depth or amplitude as compared to the pitch or complete cycle of the curve. With this particular design, by varying the chip load with respect to the depth, it is possible to produce continuous or discontinuous chips as desired.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An end mill having an improved cutting action including in combination a shank end portion and a cutting end portion, said cutting end portion comprising a plurality of spaced cutting edges extending in a helical direction, each said cutting edge in its developed condition following substantially the path of a regular curve defining peaks and valleys, the depth from a peak to a valley being small as compared to the pitch distance between adjacent peaks, the peaks and valleys defined by the curve of one cuting edge being offset with respect to the corresponding peaks and valleys defined by the curve of an adjacent cutting edge in accordance with the formula:

$$\text{Offset} = \frac{\text{Pitch}}{\text{No. of cutting edges}}$$

said pitch being in the range of from 1/8″ to 1 1/2″ and said depths being in the range of from .0001″ to .016″ for end mills having working diameters in the range of from 1/16″ to 3.0″ and the chip load design for said end mills being substantially equal to said depths with said chip load being determined by the formula:

$$\text{Chip load} = \frac{\text{Feed rate/rev.}}{\text{No. of cutting edges}}$$

whereby either continuous or discontinuous chips can be cut by said end mill.

2. An end mill having an improved cutting action including in combination a shank end portion and a cutting end portion, said cutting end portion comprising a plurality of flutes each extending in a generally helical direction, each flute having a cutting edge extending in the same generally helical direction, each said cutting edge in its developed condition following substantially the path of a regular continuous curve defining peaks and valleys, the depth from a peak to a valley being small as compared to the pitch distance between adjacent peaks, the peaks and valleys defined by the curve of one cutting edge being offset with respect to the corresponding peaks and valleys defined by the curve of an adjacent cutting edge in accordance with the formula:

$$\text{Offset} = \frac{\text{Pitch}}{\text{No. of cutting edges}}$$

said pitch being in the range of from 1/8″ to 1½″ and said depths being in the range of from .0001″ to .016″ for end mills having working diameters in the range of from 1/16″ to 3.0″ and the chip load design for said end mills being substantially equal to said depths with said chip load being determined by the formula:

$$\text{Chip load} = \frac{\text{Feed rate/rev.}}{\text{No. of cutting edges}}$$

whereby either continuous or discontinuous chips can be cut by said end mill.

3. A rotating cutting tool having an improved cutting action comprising a cutting portion, said cutting portion having a plurality of spaced cutting edges, each of said spaced cutting edges following the path of a curve which defines alternate peaks and valleys, the depth from a peak to a valley being small as compared to the pitch distance between adjacent peaks with the depths being in a range of from .0001 inch to .016 inch for pitches in the range of from 1/8 of an inch to 1½ inches, the peaks and valleys defined by the curve of one cutting edge being offset with respect to the corresponding peaks and valleys defined by the curve of another cutting edge.

4. A rotating cutting tool having an improved cutting action comprising a cutting portion, said cutting portion having a plurality of spaced cutting edges, each of said spaced cutting edges following the path of a curve which defines alternate peaks and valleys, the depth from a peak to a valley being small as compared to the pitch distance between adjacent peaks with the depths being in a range of from .0001 inch to .016 inch for pitches in the range of from 1/8 of an inch to 1½ inches, the peaks and valleys defined by the curve of one cutting edge being offset with respect to the corresponding peaks and valleys defined by the curve of another cutting edge, said depth from a peak to a valley increasing on the order of .0015 inch for each 1/8 of an inch increase in said pitch distance between adjacent peaks.

References Cited in the file of this patent

FOREIGN PATENTS 1,230,614    France _____ Apr. 4, 1960